United States Patent
Fujii et al.

(10) Patent No.: US 9,853,892 B2
(45) Date of Patent: Dec. 26, 2017

(54) CONTROL METHOD, INFORMATION PROCESSING DEVICE, AND COMMUNICATION SYSTEM

(71) Applicant: FUJITSU LIMITED, Kawasaki-shi, Kanagawa (JP)

(72) Inventors: Hiroyuki Fujii, Kawasaki (JP); Koichiro Hojo, Yokohama (JP); Akira Sugiyama, Yokohama (JP); Ryuichi Kimura, Kawasaki (JP); Shuang Xu, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 189 days.

(21) Appl. No.: 14/812,308

(22) Filed: Jul. 29, 2015

(65) Prior Publication Data
US 2016/0080266 A1 Mar. 17, 2016

(30) Foreign Application Priority Data
Sep. 16, 2014 (JP) ................................. 2014-187446

(51) Int. Cl.
| H04L 12/28 | (2006.01) |
| H04L 12/715 | (2013.01) |
| H04L 12/751 | (2013.01) |
| H04L 12/703 | (2013.01) |

(52) U.S. Cl.
CPC .............. *H04L 45/64* (2013.01); *H04L 45/02* (2013.01); *H04L 45/28* (2013.01)

(58) Field of Classification Search
CPC .............................. H04L 47/122; H04L 45/22
USPC ......................................................... 370/241
See application file for complete search history.

(56) References Cited

U.S. PATENT DOCUMENTS

| 9,497,107 B1* | 11/2016 | Akiya | H04L 45/22 |
| 2011/0016243 A1* | 1/2011 | Wu | H04L 45/02 710/110 |
| 2015/0188624 A1* | 7/2015 | Syed | H04B 10/032 398/5 |
| 2015/0312658 A1* | 10/2015 | Winzer | H04Q 11/0005 398/5 |

(Continued)

FOREIGN PATENT DOCUMENTS

| JP | 2004-32173 | 1/2004 |
| JP | 2006-503506 | 1/2006 |

(Continued)

*Primary Examiner* — Farah Faroul
(74) *Attorney, Agent, or Firm* — Staas & Halsey LLP

(57) ABSTRACT

A control method executed by an information processing device including a memory configured to store information on a plurality of temporary routes set for each kind of service, the control method includes receiving a routing request from a switch among a plurality of switches; extracting, from the memory, a temporary route corresponding to a service related to the routing request when it is determined that processing congestion of the information processing device occurs; setting the extracted temporary route for one or more related switches among the plurality of switches; determining a route corresponding to the service, based on a predetermined condition of the service, when it is determined that the processing congestion of the information processing device has subsided; and setting the determined route for the one or more related switches among the plurality of switches.

12 Claims, 20 Drawing Sheets

(56) References Cited

U.S. PATENT DOCUMENTS

2015/0372902 A1* 12/2015 Giorgetti ................ H04L 45/64
                                                        370/219
2016/0337168 A1* 11/2016 Rebella .................. H04L 45/22

FOREIGN PATENT DOCUMENTS

| JP | 2007-49336 | 2/2007 |
| JP | 2012-49674 | 3/2012 |
| WO | 2004/036814 A2 | 4/2004 |

* cited by examiner

FIG. 5

SERVICE-SPECIFIC DEMAND RESOURCES

| SERVICE NUMBER | DEMAND BANDWIDTH | NUMBER OF RELAY HOPS | RECALCULATION PRIORITY | DELAYED TIME ORDER | DEMAND COST VALUE |
|---|---|---|---|---|---|
| A | 1G | 3 | 1 | μsec | 0.3 |
| B | 100M | 10 | 6 | msec | 10 |
| C | 20M | 5 | 8 | sec | 25 |
| ZZ | 80M | 12 | 5 | sec | 15 |

FIG. 6

SDN SWITCH PATH INFORMATION

| OPPOSITE NODE NUMBER | MAXIMUM BANDWIDTH | AVAILABLE BANDWIDTH | NUMBER OF AVAILABLE PORTS | AVAILABILITY |
|---|---|---|---|---|
| 1 | 100M | 80M | 20 | AVAILABLE |
| 3 | 1G | 0 | 0 | NOT AVAILABLE |
| 4 | 20G | 15G | 15 | AVAILABLE |
| 6 | 10G | 2G | 3 | AVAILABLE |
| 7 | 10G | 7G | 5 | AVAILABLE |
| 8 | 40G | 200M | 8 | AVAILABLE |

FIG. 7

TEMPORARY ROUTE TABLE

| SERVICE NAME | TEMPORARY ROUTE | | COMMUNICATION PATH | | | | |
|---|---|---|---|---|---|---|---|
| SERVICE A | #1 | SWITCH NUMBER | 1 | 4 | 10 | 11 | |
| | | PORT NUMBER | →(#1)···(#11)→ | →(#4)···(#14)→ | →(#1)···(#11)→ | →(#1)···(#11)→ | |
| | #2 | SWITCH NUMBER | 1 | 2 | 6 | 8 | |
| | | PORT NUMBER | →(#1)···(#11)→ | →(#1)···(#11)→ | →(#1)···(#11)→ | →(#4)···(#14)→ | |
| | #3 | SWITCH NUMBER | 1 | 5 | 8 | 12 | |
| | | PORT NUMBER | →(#1)···(#11)→ | →(#4)···(#14)→ | →(#4)···(#14)→ | →(#1)···(#11)→ | |

FIG. 12

| SERVICE NAME | | COMMUNICATION PATH | | | | | |
|---|---|---|---|---|---|---|---|
| SERVICE A | SWITCH | 1 | →(#1)···(#11)→ | 5 | →(#1)···(#11)→ | 7 | →(#1)···(#11)→ | 11 | →(#1)···(#11)→ | 12 |
| | PORT | →(#1)···(#11)→ | 5 | →(#1)···(#11)→ | 7 | →(#1)···(#11)→ | 11 | →(#1)···(#11)→ | 12 | |
| SERVICE B | SWITCH | 4 | →(#1)···(#11)→ | 7 | →(#1)···(#11)→ | 8 | →(#1)···(#11)→ | 12 | - |
| | PORT | →(#1)···(#11)→ | 7 | →(#1)···(#11)→ | 8 | →(#2)···(#12)→ | 12 | | |
| SERVICE C | SWITCH | 4 | →(#2)···(#12)→ | 5 | →(#2)···(#12)→ | 7 | →(#2)···(#12)→ | 8 | →(#1)···(#11)→ | 9 |
| | PORT | →(#2)···(#12)→ | 5 | →(#2)···(#12)→ | 7 | →(#2)···(#12)→ | 8 | →(#1)···(#11)→ | 9 | |
| SERVICE D | SWITCH | 4 | →(#3)···(#13)→ | 5 | →(#3)···(#13)→ | 8 | →(#2)···(#12)→ | 9 | - |
| | PORT | →(#3)···(#13)→ | 5 | →(#3)···(#13)→ | 8 | →(#2)···(#12)→ | 9 | | |

FIG. 13

| SERVICE NAME | TEMPORARY ROUTE | | COMMUNICATION PATH | | | | | | | |
|---|---|---|---|---|---|---|---|---|---|---|
| SERVICE A | (#1) | SWITCH | 1 | | 4 | | 10 | | 11 | | 12 |
| | | PORT | →(#1)···(#11)→ | | →(#4)···(#11)→ | | →(#1)···(#11)→ | | →(#1)···(#11)→ | | →(#1)···(#11)→ |
| | #2 | SWITCH | 1 | | 2 | | 6 | | 8 | | 12 |
| | | PORT | →(#1)···(#11)→ | | →(#1)···(#11)→ | | →(#1)···(#14)→ | | →(#4)···(#14)→ | | →(#1)···(#11)→ |
| | #3 | SWITCH | 1 | | 5 | | 8 | | 12 | | - |
| | | PORT | →(#1)···(#11)→ | | →(#4)···(#14)→ | | →(#1)···(#11)→ | | →(#1)···(#11)→ | | - |
| SERVICE B | #1 | SWITCH | 4 | | 5 | | 8 | | 12 | | - |
| | | PORT | →(#1)···(#11)→ | | →(#4)···(#14)→ | | →(#1)···(#14)→ | | →(#1)···(#11)→ | | - |
| | #2 | SWITCH | 4 | | 7 | | 11 | | 12 | | - |
| | | PORT | →(#1)···(#11)→ | | →(#2)···(#12)→ | | →(#2)···(#12)→ | | →(#2)···(#12)→ | | - |
| | (#3) | SWITCH | 4 | | 10 | | 11 | | 12 | | - |
| | | PORT | →(#1)···(#11)→ | | →(#2)···(#12)→ | | →(#2)···(#12)→ | | →(#2)···(#12)→ | | - |
| SERVICE C | #1 | SWITCH | 4 | | 5 | | 6 | | 9 | | - |
| | | PORT | →(#2)···(#12)→ | | →(#2)···(#12)→ | | →(#2)···(#12)→ | | →(#1)···(#11)→ | | - |
| | (#2) | SWITCH | 4 | | 10 | | 11 | | 9 | | - |
| | | PORT | →(#2)···(#12)→ | | →(#3)···(#13)→ | | →(#3)···(#13)→ | | →(#1)···(#11)→ | | - |
| | #3 | SWITCH | 4 | | 2 | | 6 | | 9 | | - |
| | | PORT | →(#2)···(#12)→ | | →(#3)···(#13)→ | | →(#3)···(#13)→ | | →(#1)···(#11)→ | | - |
| SERVICE D | (#1) | SWITCH | 4 | | 10 | | 11 | | 9 | | - |
| | | PORT | →(#3)···(#13)→ | | →(#4)···(#14)→ | | →(#4)···(#14)→ | | →(#2)···(#12)→ | | - |
| | #2 | SWITCH | 4 | | 10 | | 8 | | 9 | | - |
| | | PORT | →(#3)···(#13)→ | | →(#4)···(#14)→ | | →(#4)···(#14)→ | | →(#2)···(#12)→ | | - |
| | #3 | SWITCH | 4 | | 2 | | 6 | | 9 | | - |
| | | PORT | →(#3)···(#13)→ | | →(#4)···(#14)→ | | →(#3)···(#13)→ | | →(#2)···(#12)→ | | - |

FIG. 16

ROUTE TABLE (WHEN TEMPORARY ROUTE IS CHANGED)

| SERVICE NAME | | \multicolumn{6}{c}{COMMUNICATION PATH} | | | | |
|---|---|---|---|---|---|---|---|
| SERVICE A | SWITCH | 1 | →(#1)···(#11)→ | 4 | →(#4)···(#14)→ | 10 | →(#1)···(#11)→ | 11 | →(#1)···(#11)→ | 12 |
| | PORT | | | | | | | | | |
| SERVICE B | SWITCH | 4 | →(#1)···(#11)→ | 10 | →(#2)···(#12)→ | 11 | →(#2)···(#12)→ | 12 | | - |
| | PORT | | | | | | | | | |
| SERVICE C | SWITCH | 4 | →(#2)···(#12)→ | 10 | →(#3)···(#13)→ | 11 | →(#1)···(#11)→ | 9 | | - |
| | PORT | | | | | | | | | |
| SERVICE D | SWITCH | 4 | →(#3)···(#13)→ | 10 | →(#4)···(#14)→ | 11 | →(#2)···(#12)→ | 9 | | - |
| | PORT | | | | | | | | | |

FIG. 18

ROUTE TABLE (AFTER FORMAL RECALCULATION OF ROUTE AFTER RELEASE OF CONGESTION)

| SERVICE NAME | | COMMUNICATION PATH | | | | |
|---|---|---|---|---|---|---|
| SERVICE A | SWITCH | 1 | 4 | 10 | 11 | 12 |
| | PORT | →(#1)...(#11)→ | →(#4)...(#14)→ | →(#1)...(#11)→ | →(#1)...(#11)→ | →(#1)...(#11)→ |
| SERVICE B | SWITCH | 4 | 7 | 11 | 12 | - |
| | PORT | →(#1)...(#11)→ | →(#1)...(#11)→ | →(#2)...(#12)→ | →(#2)...(#12)→ | |
| SERVICE C | SWITCH | 4 | 2 | 6 | 9 | - |
| | PORT | →(#2)...(#12)→ | →(#3)...(#13)→ | →(#2)...(#12)→ | →(#1)...(#11)→ | |
| SERVICE D | SWITCH | 4 | 2 | 3 | 9 | - |
| | PORT | →(#3)...(#13)→ | →(#4)...(#14)→ | →(#1)...(#11)→ | →(#2)...(#12)→ | |

CONTROL METHOD, INFORMATION PROCESSING DEVICE, AND COMMUNICATION SYSTEM

CROSS-REFERENCE TO RELATED APPLICATION

This application is based upon and claims the benefit of priority of the prior Japanese Patent Application No. 2014-187446, filed on Sep. 16, 2014, the entire contents of which are incorporated herein by reference.

FIELD

The embodiment discussed herein is related to a control method, an information processing device, and a communication system.

BACKGROUND

Software defined networking (SDN) is networking in which the configuration of a network, paths for each service, or the like may be dynamically set and changed. In SDN, an SDN controller sets up a plurality of SDN switches. Among the plurality of SDN switches, a network for data transmission is constructed. Between the plurality of SDN switches and the SDN controller, a network for control is constructed so as to be physically or logically separate from the network for data transmission.

FIG. 1 is a diagram illustrating an example of processing upon occurrence of a failure in an SDN network. In the SDN network illustrated in FIG. 1, an OpenFlow interface is used. Physical devices, fibers, and the like are shared among SDN switches. In the case where a sudden failure such as a device failure or a fiber disconnection occurs, an SDN switch, having detected link disconnection due to this failure, sends to the SDN controller a Port Status message that notifies the SDN controller that link disconnection has occurred.

Upon receiving the Port Status message from the SDN switch, the SDN controller performs routing for each service that performs communication over a route passing through the port of which the SDN controller has been notified by the Port Status message. Once a new route is decided by routing, a Flow Mod message from the SDN controller notifies each SDN switch to set the new route. The SDN switch stores a flow table in which behaviors of each service for packets are defined. The SDN switch records setting of the new route in the flow table according to the Flow Mod message. From that point on, the SDN switch transfers packets using the new route according to the flow table. As related art techniques, for example, Japanese Laid-open Patent Publication No. 2007-49336 and Japanese National Publication of International Patent Application 2006-503506 are disclosed.

However, when many services for which routing is to be performed are present, the processing load on the SDN controller caused by routing increases, and thus there is a possibility that processing congestion will occur in the SDN controller. If processing congestion of the SDN controller occurs, the time taken until a new route is decided becomes longer. In this case, in an SDN switch having a port where a failure has occurred, there is a possibility that a large number of received packets will be discarded.

When processing congestion of the SDN controller or packet discarding occurs, communication might be cut off for a long time in the service in question.

When the SDN switch receives an unknown packet, information on which is not found in the flow table, and sends a Packet In message to the SDN controller, there is also a possibility that a phenomenon where communication is cut off for a long time will occur. The SDN controller, upon receiving the Packet In message, performs a routing process for the unknown packet of which the SDN controller has been notified by the received Packet In message. It is desirable to be able to reduce the time over which communication is cut off as a result of the occurrence of processing congestion due to reception of routing requests of an information processing device that performs routing.

SUMMARY

According to an aspect of the invention, a control method executed by an information processing device including a memory configured to store information on a plurality of temporary routes set for each kind of service, the control method includes receiving a routing request from a switch among a plurality of switches; extracting, from the memory, a temporary route corresponding to a service related to the routing request when it is determined that processing congestion of the information processing device occurs; setting the extracted temporary route for one or more related switches among the plurality of switches; determining a route corresponding to the service, based on a predetermined condition of the service, when it is determined that the processing congestion of the information processing device has subsided; and setting the determined route for the one or more related switches among the plurality of switches.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 is a diagram depicting an example of a service-specific demand resource table;

FIG. 6 depicts an example of SDN switch path information;

FIG. 7 depicts an example of a temporary route table;

FIG. 12 is a diagram depicting an example of a route table of the SDN controller in the SDN network illustrated in FIG. 11;

FIG. 13 is a diagram depicting an example of a temporary table of the SDN controller in the SDN network illustrated in FIG. 11;

FIG. 16 is an example of a route table of the SDN controller in the SDN network illustrated in FIG. 15;

FIG. 18 is an example of a route table of the SDN controller in the SDN network illustrated in FIG. 17;

DESCRIPTION OF EMBODIMENT

Hereinafter, an embodiment of the present disclosure will be described with reference to the accompanying drawings. The embodiment described below is illustrative, and the present disclosure is not limited to the configuration of the embodiment.

First Embodiment

Figure 1:
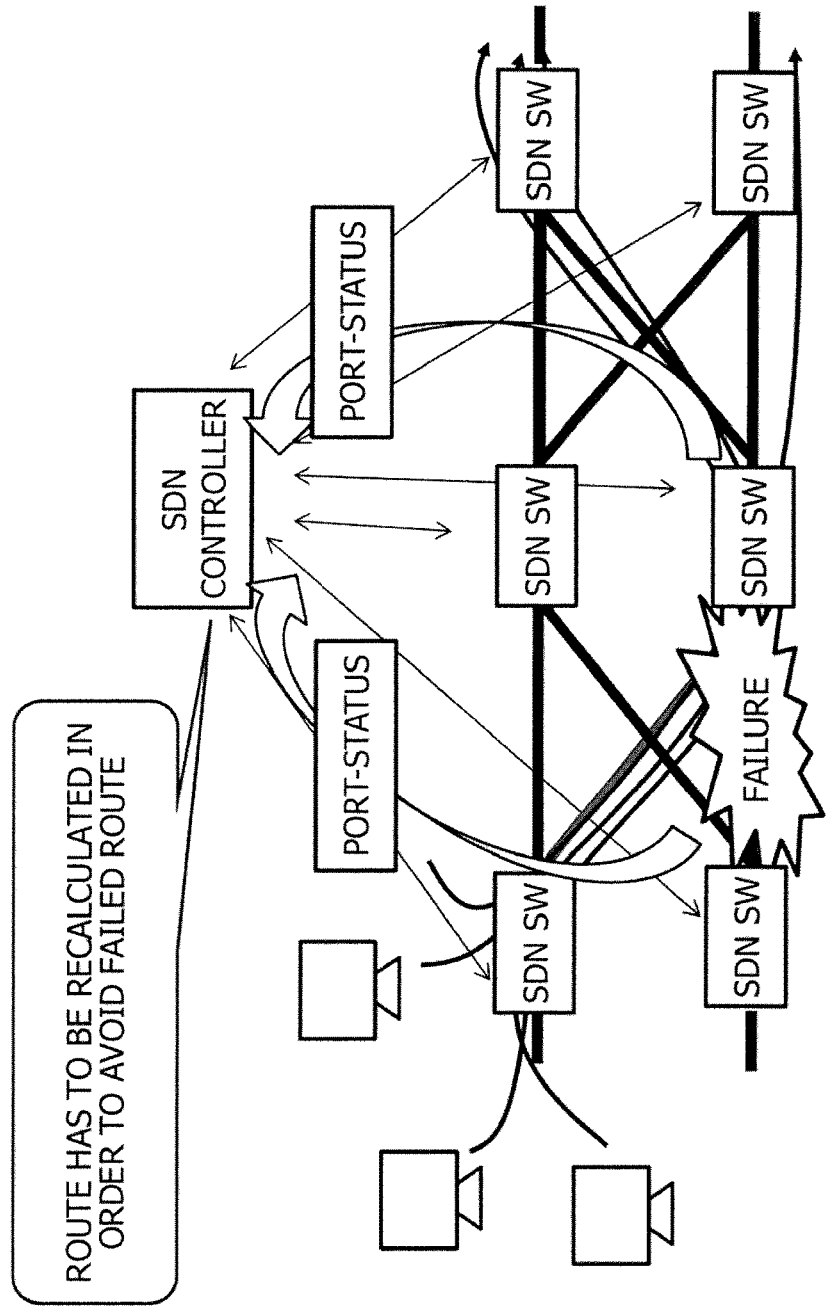
FIG. 1 is a diagram illustrating a processing example during occurrence of a failure in an SDN network.
Figure 2:
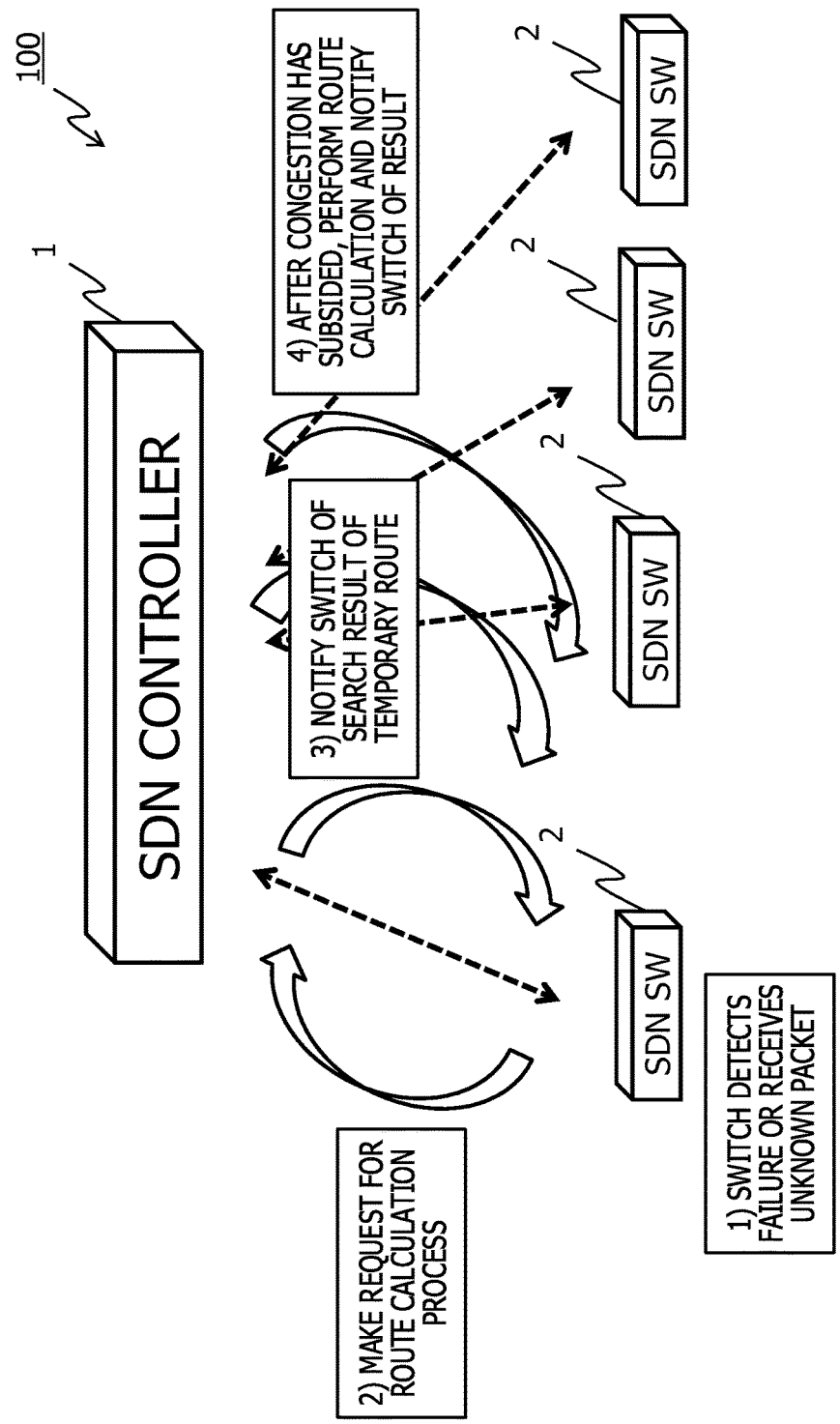
FIG. 2 is a diagram illustrating an example of a configuration of an SDN network according to a first embodiment.

FIG. 2 is a diagram illustrating an example of a configuration of an SDN network according to a first embodiment. An SDN network 100 includes an SDN controller 1 and a plurality of SDN switches 2.

The flow of processing in the first embodiment is as described below.

(1) An SDN switch 2 detects occurrence of a failure. Alternatively, the SDN switch 2 receives an unknown packet, information on which is absent in a flow table. The flow table includes information on a flow, and actions of the SDN switch 2 upon reception of a packet of the flow in question.

(2) When detecting the occurrence of a failure, the SDN switch 2 sends a Port Status message to the SDN controller 1. When receiving an unknown packet, the SDN switch 2 sends a Packet In message to the SDN controller 1. The Port Status message includes information on a port where link disconnection is detected. The Packet In message includes information on the received unknown packet, information on a port at which the unknown packet is received, and so forth.

(3) Upon receiving a Port Status or Packet In message, the SDN switch 1 performs a routing process. However, if the processing load of the SDN controller 1 is larger than or equal to a given threshold, the SDN controller 1 determines that control congestion has occurred. The SDN controller 1 then performs a search for a temporary route, not performing a routing process. Subsequently, the SDN controller 1 sets flow information corresponding to a temporary route, which is a search result, in the related SDN switches 2. The temporary route is a route stored in advance by the SDN controller 1. The temporary route is a route that ensures continuity of communication, regardless of whether or not the route is the most suitable for the service in question. The flow information is a packet classification rule and includes, for example, identification information of a service for a packet and information on a transfer port and the like of a packet corresponding to the identification information of the service.

Notification of the flow information corresponding to a temporary route is provided by way of Flow Mod messages to the SDN switches 2 for which there is a change in route setting. However, it is not clearly demonstrated that the flow information of which notification is provided corresponds to the temporary route.

The SDN switches 2 that have received the Flow Mod messages set flow tables according to the flow information included in the Flow Mod messages and transfer packets according to the flow tables. Thereby, the temporary route is set.

(4) After providing notification of flow information corresponding to the temporary route, the SDN controller 1 determines that control congestion has subsided. In this case, the SDN controller 1 performs a routing process for a service for which notification of flow information corresponding to the temporary route has been provided. Then, the SDN controller 1 sets a route resulting from routing on the related SDN switches 2. Notification of flow information corresponding to the route resulting from the routing process is provided by way of Flow Mod messages. The SDN switches 2 that have received the Flow Mod messages rewrite the settings of the flow tables and transfer packets according to the flow tables. This causes a change from the temporary route to the route resulting from the routing process.

In the first embodiment, when there is control congestion, the SDN controller 1 temporarily reserves routing. Then, the SDN controller 1 notifies the related SDN switches 2 of flow information corresponding to the temporary route.

This may reduce the time over which communication is cut off when link disconnection occurs or when an unknown packet is received. After control congestion has subsided, the SDN controller 1 performs a routing process and notifies the related SDN switches 2 of flow information corresponding to a new route. The temporary route is not necessarily the most suitable for a service. For this reason, after control congestion has subsided, communication is performed by using a route more suitable for the service and the network situation.

In the first embodiment, the service refers to a contract unit. For example, in the case where one user has made a plurality of contracts, flows with the same transmission source, the same destination, and the same application are identified as different services. Conditions such as a communication speed, a delay, and a used bandwidth differ for each service. Conditions for services, such as communication speeds, delays, and used bandwidths will be referred to as service conditions hereinafter. The service conditions are an example of "communication contract conditions". Hereinafter, a route is referred to also as a path.

The SDN controller 1 initiates a routing process upon receiving a Port Status message or a Packet In message. Therefore, a Port Status message or a Packet In message may be considered to be a message for making a request for a routing process. A Port Status message and a Packet In message are each an example of a "routing request".

Figure 3:
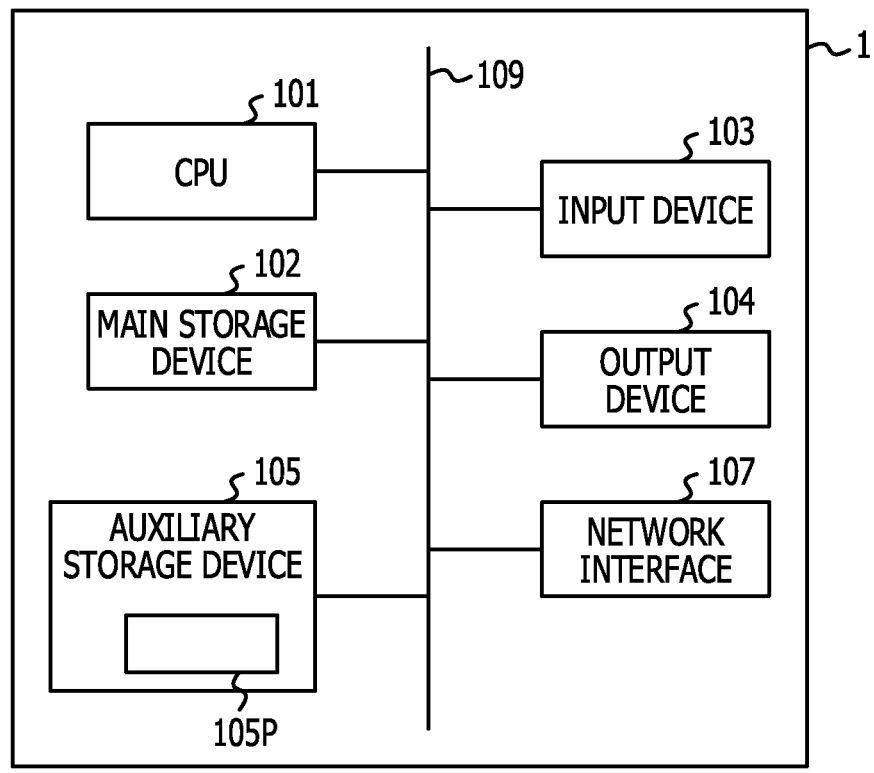
FIG. 3 illustrates an example of a hardware configuration of an SDN controller.

FIG. 3 is an example of a hardware configuration of the SDN controller 1. The SDN controller 1 is a virtual machine (VM). The SDN controller 1 is, in reality, for example, a dedicated computer, such as a server, or a general-purpose computer, such as a personal computer (PC).

The SDN controller 1 is an information processing device including a central processing unit (CPU) 101, a main storage device 102, an input device 103, an output device 104, an auxiliary storage device 105, and a network interface 107. These components are mutually coupled via a bus 109.

The input device 103 is, for example, a keyboard, operation buttons, a touch panel, a key pad, or the like. Data from the input device 103 is output to the CPU 101.

The auxiliary storage device 105 stores an operating system (OS), various programs, and data used by the CPU 101 during execution of each program. The auxiliary storage device 105 is, for example, a nonvolatile memory, such as an erasable programmable ROM (EPROM), a flash memory, or a hard disk drive. The auxiliary storage device 105 stores, for example, an SDN controller program 105P. The SDN controller 105P is a program for causing a computer to run as an SDN controller.

The main storage device 102 is a storage device referred to as a so-called memory that provides, to the CPU 101, a storage area to which programs stored in the auxiliary storage device 105 are loaded and a working area and that is used as a buffer. The main storage device 102 includes, for example, a semiconductor memory such as a read only memory (ROM) or a random access memory (RAM).

The CPU 101 loads the OS stored in the auxiliary storage device 105 and various application programs into the main storage device 102 and executes the OS and the programs, thereby executing various processes. The CPU 101 is not limited to one and a plurality of thereof may be provided.

The network interface 107 is an interface that inputs and outputs information to and from a network. The network interface 107 may be an interface with a wired network and may also be a network coupled to a wireless network. The network interface 107 is, for example, a processing circuit of wireless signals, such as a network interface card (NIC) or a wireless local area network (LAN). Data and the like received by the network interface 107 are output to the CPU 101.

The output device 104 outputs a result of processing of the CPU 101. The output device 104 includes a display and a printer.

The hardware configuration of the SDN controller 1 illustrated in FIG. 3 is an example and is not limited to the above, and removal, replacement, and addition of elements thereof may be made appropriately in accordance with the embodiment. For example, the SDN controller 1 may include a portable recording medium drive device and may execute a program recorded on a portable recording medium. The portable recording medium is, for example, a recording medium such as a secure digital (SD) memory card, a mini SD card, a micro SD card, a universal serial bus (USB) flash memory, a compact disc (CD), a digital versatile disc (DVD), a Blu-ray (registered mark) disc, or a flash memory card. The SDN controller 1 does not have to include, for example, the input device 103 and the output device 104.

Figure 4:
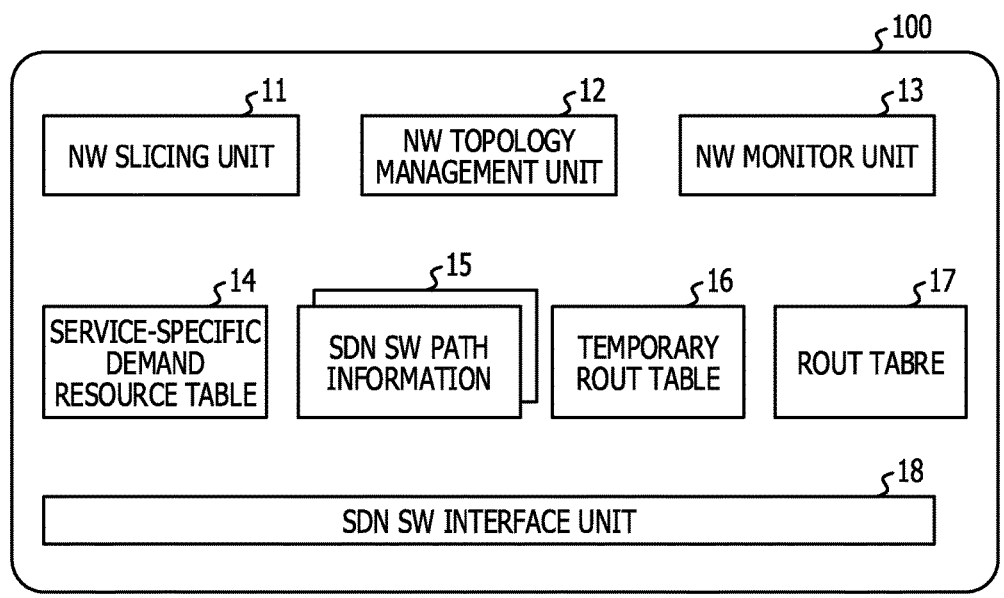
FIG. 4 is a diagram illustrating an example of a functional configuration of the SDN controller.

FIG. 4 is a diagram illustrating an example of a functional configuration of the SDN controller 1. The functional configuration of the SDN controller 1 illustrated in FIG. 4 is a functional configuration achieved when the CPU 101 executes the SDN controller program 105P. However, the functional configuration of the SDN controller 1 illustrated in FIG. 4 is not limited to this and may be achieved with an electric circuit such as a field-programmable gate array (FPGA) or an application specific integrated circuit (ASIC).

The SDN controller 1 includes, in its functional configuration, an NW slicing unit 11, an NW topology management unit 12, an NW monitor unit 13, an SDN switch interface unit 18, a service-specific demand resource table 14, an SDN switch path information 15, a temporary route table 16, and a route table 17. The service-specific demand resource table 14, the SDN switch path information 15, the temporary route table 16, and the route table 17 are created, for example, in a storage area of the main storage device 102.

The SDN switch interface unit 18 is an interface with the SDN switches 2. OpenFlow messages that are exchanged with the SDN switches 2, such as Port Status messages, Packet In messages, and Flow Mod messages, are sent and received via the SDN switch interface unit 18.

The NY monitor unit 13 receives, via the SDN switch interface unit 18, a message providing notification of a change in the state of a network. Upon receiving a message providing notification of a change in network state, the NW monitor unit 13 notifies the NW topology management unit 12. Examples of OpenFlow messages providing notification of a change in network state include Port Status messages and Packet In messages.

The NY monitor unit 13 detects, as one of processing, that control congestion due to the processing load of the SDN controller 1 has occurred and subsided. The occurrence of control congestion due to the processing load of the SDN controller 1 is detected, for example, by the fact that routing requests above a threshold are accepted within a certain period, an internal resource utilization rate, such as a CPU usage rate, becomes greater than or equal to a threshold, and the processing time from acceptance of a routing request to response notification is over a threshold. Examples of routing requests include Port Status messages and Packet In messages. The NW monitor unit 13 is an example of a "congestion detection unit".

The NW slicing unit 11 manages information on a virtual network built for each service. The NW slicing unit 11 performs, as one of processing, a routing process of selecting a path of a service, by using the service-specific demand resource table 14 and the SDN switch path information 15. For example, when a Port Status message comes, the NW slicing unit 11 recalculates the path of a service that would pass through a failed port. For example, when a Packet In message comes, the NW slicing unit 11 determines a service corresponding to an unknown packet notification of which is provided by the Packet In message and calculates the path of the corresponding service.

In the first embodiment, the NW slicing unit 11 performs a routing process when a Port Status message or a Packet In message has come and no control congestion in the SDN controller 1 has occurred or control congestion has subsided. When a Port Status message or a Packet In message has come and when control congestion has occurred, the NW slicing unit 11 searches for a temporary route. The NW slicing unit 11 then notifies each SDN switch 2 of flow information based on a search result.

In the first embodiment, if a routing process is performed, the NW slicing unit 11 stores some of the paths not selected, as temporary routes, in the temporary route table 16. As the temporary routes, routes passing through ports that are as different as possible from those in the selected path are selected. Routes that are more compliant with service conditions may be selected as temporary routes. Alternatively, one temporary route common to all the services may be registered in advance. The NW slicing unit 11 is an example of a "control unit".

The NW topology management unit 12 manages information on the entire network. For example, the NW topology management unit 12 manages information on links between the SDN switches 2 or information on each SDN switch 2. The information on the SDN switch 2 is, for example, a switch identifier (ID), the number of contained ports, a port ID, and the like.

FIG. 5 is a diagram depicting an example of the service-specific demand resource table 14. The service-specific demand resource table 14 stores information on resources demanded by each service and is used in a routing process. Information stored in the service-specific demand resource table 14 is set from a control terminal to the SDN controller 1 by an administrator of the SDN network 100.

In the example depicted in FIG. 5, a service identification number, a demand bandwidth, the number of relay hops, a recalculation priority, a delayed time order, a demand cost value, and so on are stored in an entry of the service-specific demand resource table 14. Information stored in the service-specific demand resource table 14 is not limited to that depicted in FIG. 5.

FIG. 6 depicts an example of the SDN switch path information 15. The SDN switch path information 15 is information of a switch serving as the link destination of each SDN switch 2 and is used for, for example, a routing process. The SDN switch path information 15 is prepared for each SDN switch 2 in the SDN network 100.

In the SDN switch path information 15, for example, an opposite node number, a maximum bandwidth, an available bandwidth, the number of available ports, and availability are stored. The opposite node number is an identification number of the SDN switch 2 serving as a link destination. The maximum bandwidth is the maximum bandwidth of a link. The available bandwidth is a remaining bandwidth that is available for the link in question. The number of available ports is the number of ports that are available for each link. The availability indicates whether or not each link is available.

The example depicted in FIG. 6 is the SDN switch path information 15 for the SDN switch #5, and an "Opposite node number" item indicates that the SDN switch #5 has established links with the SDN switches #1, #3, #4, #6, #7, and #8. For example, in a routing process, when, in the service-specific demand resource table 14, the demand bandwidth for a service is 1 Gigabits per second (Gbps), a link established with a node with an "available bandwidth" of 1 Gbps or more in the SDN switch path information 15 is selected.

Information stored in the SDN switch path information 15 is acquired, for example, by using a Feature response message exchanged in a process of establishing a channel between the SDN switch 2 and the SDN controller 1 and a Multipart response message sent from the SDN switch 2. The SDN switch path information 15 is managed by the NW topology management unit 12. Information stored in the SDN switch path information 15 is not limited to that depicted in FIG. 6.

FIG. 7 depicts an example of the temporary route table 16. The temporary route table 16 is used for a search for a temporary route when the SDN controller 1 has received a route selection request such as a Port Status message or a Packet In message and control congestion has occurred.

In the example depicted in FIG. 7, a plurality of temporary routes are prepared for each service. In an entry of each temporary route, the identification numbers of the SDN switches 2 and the reception port and the transfer port of each SDN switch 2 are stored in relay order. The main storage device 102 storing the temporary route table 16 is an example of a "storage unit".

Although not illustrated in the drawing, one path is stored for each service in the route table 17, and the data structure of the entry of the path is similar to that in the temporary route table 16. The temporary route table 16 and the route table 17 are managed by the NW slicing unit 11. The data structure of the temporary route table 16 is not limited to that depicted in FIG. 7.

In a routing process, with reference to the service-specific demand resource table 14 and the SDN switch path information 15, a path more suitable for service conditions is selected. In contrast, a temporary route is a route that is relatively less likely to be used and therefore only has to satisfy the minimum acceptable service conditions. Therefore, in the first embodiment, a temporary route is selected out of paths other than a path finally selected in a routing process.

Figure 8:
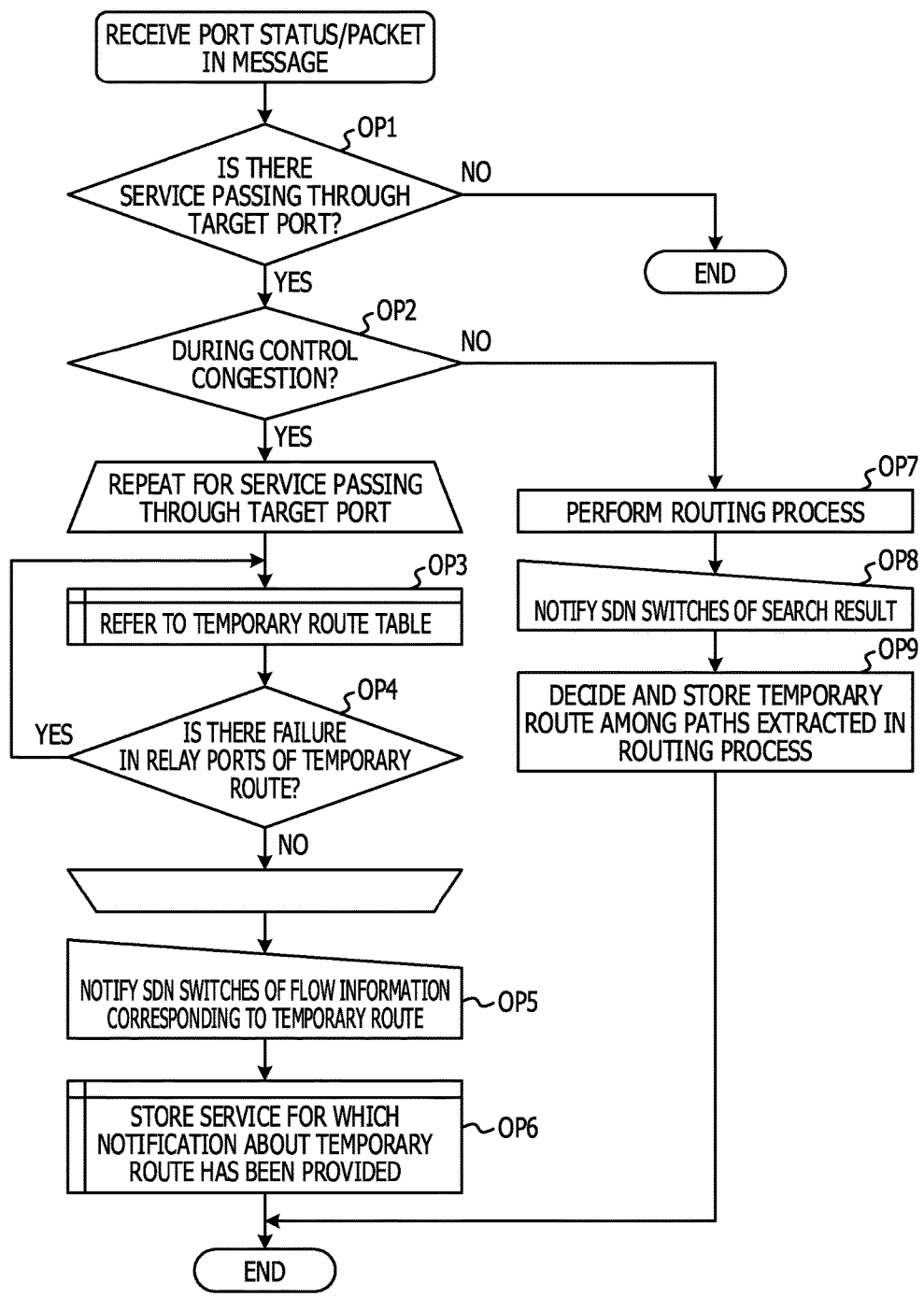
FIG. 8 illustrates an example of a flowchart of a process performed when the SDN controller receives a routing request such as a Port Status message or a Packet In message.

FIG. 8 is an example of a flowchart of a process performed when the SDN controller 1 receives a routing request such as a Port Status message, a Packet In message, or the like. The flowchart illustrated in FIG. 8 starts once a routing request such as a Port Status message or a Packet In message is received through the NW monitor unit 13. The example illustrated in FIG. 8 is provided on the precondition that the SDN controller 1 stores a table having a similar data structure to those of the tables depicted in FIG. 5 to FIG. 7.

In OP 1, the NW slicing unit 11, upon input of a Port Status message from the NW monitor unit 13, determines whether or not there is a service flowing in a path through a port for which notification of link disconnection has been provided. This determination is made by reference to the route table 17. Hereinafter, a port for which notification of link disconnection has been provided by way of a Port Status message is referred to as a failed port.

If it is determined that there is a service flowing in a path through the failed port (OP 1: YES), the process proceeds to OP 2. On the other hand, if it is determined that there is no service flowing in a path through the failed port (OP 1: NO), the process illustrated in FIG. 8 ends. The NW topology management unit 12, upon receiving a Port Status message, updates the SDN switch path information 15. In the case of reception of a Packet In message, the operation of OP 1 is omitted and the process proceeds to OP 2.

In OP 2, the NW slicing unit 11 determines whether or not control congestion occurs. This determination is made when the NW slicing unit 11 makes an inquiry to the NW monitor unit 13 about the occurrence of control congestion and determines the content of a response from the NW monitor unit 13. If it is determined that control congestion occurs (OP 2: YES), the process proceeds to OP 3. On the other hand, if it is determined that control congestion does not occur (OP 2: NO), the process proceeds to OP 7.

In OP 3, since control congestion occurs, the NW slicing unit 11 refers to the temporary route table 16 and selects one temporary route registered for the service flowing in a path through the failed port. Next, the process proceeds to OP 4.

In OP 4, the NY slicing unit 11 determines whether or not the failed port is included in relay ports in the selected temporary route. If it is determined that the failed port is included in relay ports of the selected temporary route (OP 4: YES), the process proceeds to OP 3, and the operations of OP 3 and OP 4 are repeated for the next temporary route of the target service.

On the other hand, if it is determined that the failed port is not included in relay ports of the selected temporary route (OP 4: NO), the selected temporary route is decided as the temporary route of the target service. Subsequently, for the next service flowing in a path though the failed port, the operations of OP 3 and OP 4 are repeatedly performed.

When temporary routes for all the services each flowing in a path through the failed port are determined, the process proceeds to OP 5.

In OP 5, the NW slicing unit 11 notifies the related SDN switches 2 by way of Flow Mod messages of flow information corresponding to the temporary route of each service flowing in a path through the failed port. The Flow Mod message instructs the SDN switch 2 to add, delete, or change an entry in the flow table. The entry of the flow table includes behaviors for each service, that is, settings of, for example, a transfer destination to which, when a packet matching the service is received, the packet is to be transferred. The Flow Mod message is provided to the SDN switches 2 in the current path and on the temporary route in order to delete flow information corresponding to the current path in the flow table and to add flow information corresponding to the temporary route. The NW slicing unit 11 updates the route table 17 with the temporary route. Next, the process proceeds to OP 6.

In OP 6, the NW slicing unit 11 stores the service for which notification of the flow information corresponding to the temporary route has been provided, for example, in a storage area of the main storage device 102. Thereafter, the process illustrated in FIG. 8 ends.

The operations of OP 7 to OP 9 are operations performed when no control congestion occurs. In the initial setting processing in the SDN controller 1, the operations of OP 7 to OP 9 are performed.

In OP 7, the NW slicing unit 11 performs a routing process of the target service. Next, the process proceeds to OP 8.

In OP 8, the NW slicing unit 11 notifies the related SDN switches 2 by way of Flow Mod messages of flow information corresponding to a new path selected in the routing process. The NW slicing unit 11 updates the route table 17 with the new path. The Flow Mod messages are provided to the SDN switches 2 in the current path and the SDN switches 2 in the new path in order to delete flow information corresponding to the current path in the flow table and to add flow information corresponding to the new path. Next, the process proceeds to OP 9.

In OP 9, the NW slicing unit 11 selects a temporary route out of paths notification of which is not provided to the SDN switches 2 and stores the temporary route in the temporary route table 16. Thereafter, the process illustrated in FIG. 8 ends.

In the operations of selecting a temporary route in OP 3 to OP 4, using the service-specific demand resource table 14 and the SDN switch path information 15, a determination may be made as to whether or not a temporary route is more compliant with service conditions, and notification of flow information corresponding to the temporary route that is more compliant with service conditions may be provided. In order to avoid imbalance in the SDN network 100, a temporary route may be selected so that the port of the temporary route does not coincide with the port of a temporary route of another service.

Figure 9:
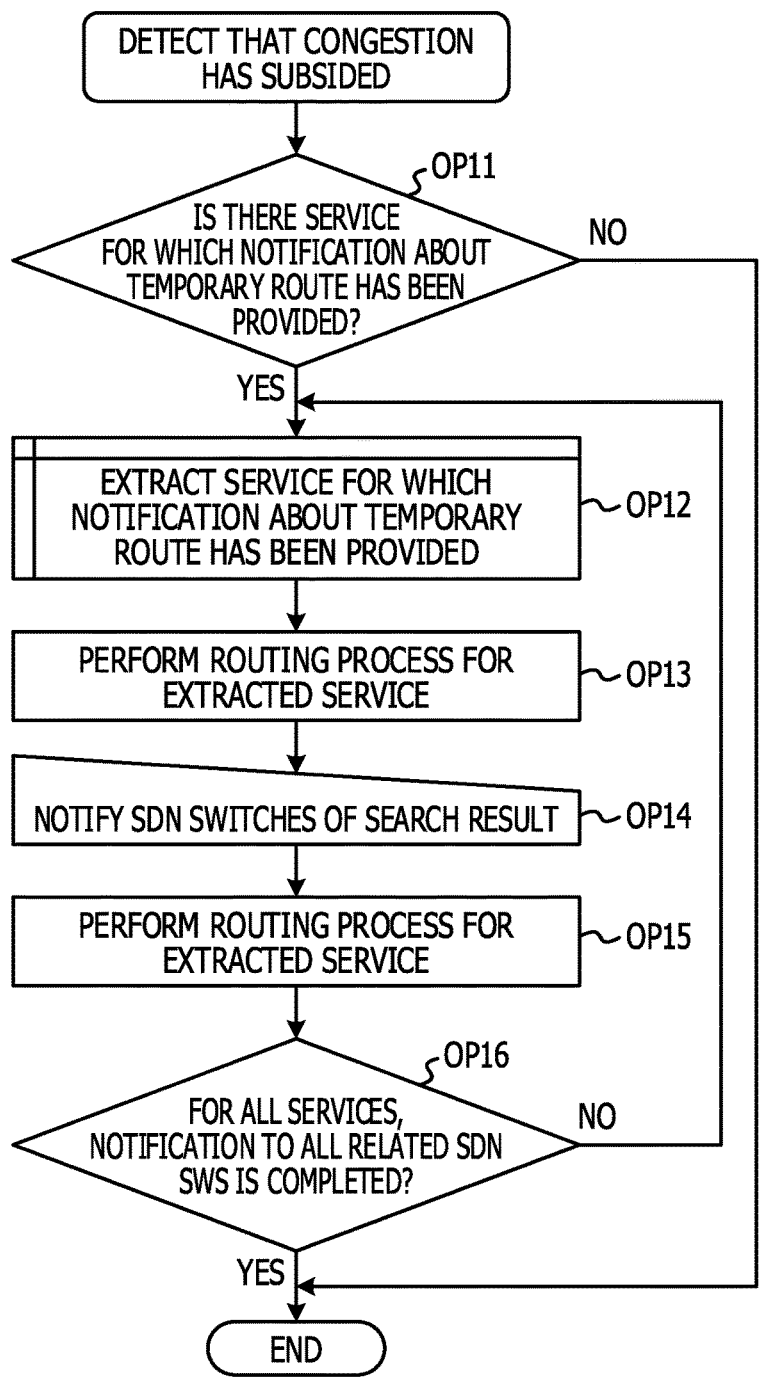
FIG. 9 is an example of a flowchart of a process of the SDN controller performed when it is detected that control congestion has subsided.

FIG. 9 is an example of a flowchart of a process of the SDN controller 1 performed when it is detected that control congestion has subsided. The flowchart illustrated in FIG. 9 starts once the NW monitor unit 13 detects that control congestion has subsided.

In OP 11, the NW slicing unit 11 determines whether or not there is a service for which notification of flow information corresponding to the temporary route has been provided. This determination is made by reference to the storage area of the main storage device 102 in which the service for which notification of flow information corresponding to the temporary route has been provided is stored in OP 6 of FIG. 8. If it is determined that there is a service for which notification of flow information corresponding to the temporary route has been provided (OP 11: YES), the process proceeds to OP 12. If it is determined that there is no service for which notification of flow information corresponding to the temporary route has been provided (OP 11: NO), the process illustrated in FIG. 9 ends.

In OP 12, the NW slicing unit 11 extracts the service for which notification of flow information corresponding to the temporary route has been provided. Next, the process proceeds to OP 13.

In OP 13, the NW slicing unit 11 performs a routing process for the extracted service. In the routing process, the NW slicing unit 11 decides upon a path of each service with reference to the service-specific demand resource table 14 and the SDN switch path information 15. Next, the process proceeds to OP 14.

In OP 14, the NW slicing unit 11 notifies the SDN switches 2 by way of Flow Mod messages of flow information corresponding to a path selected, as a search result, as a path to be used. The Flow Mod messages for notification of path setting are provided to the SDN switches 2 on the temporary route and the SDN switches 2 in the new path in order to delete flow information corresponding to the temporary route in the flow table and to add flow information corresponding to the new path. Next, the process proceeds to OP 15.

In OP 15, the NW slicing unit 11 decides upon a temporary route among paths of which the SDN switch 2 has not been notified and stores the temporary route in the temporary route table 16. Next, the process proceeds to OP 16.

In OP 16, for all the services for which notification of flow information corresponding to the temporary route has been provided, the NW slicing unit 11 determines whether or not the operations of OP 13 to OP 15 are completed. For all the services for which notification of flow information corresponding to the temporary route has been provided, it is determined that the operations of OP 13 to OP 15 are completed (OP 16: YES), the process illustrated in FIG. 9 ends. For all the services for which notification of flow information corresponding to the temporary route has been provided, it is determined that the operations of OP 13 to OP 15 are not completed (OP 16: NO), the process returns to OP 12 and the operations of OP 12 to OP 15 are performed for the next service for which notification of flow information corresponding to the temporary route has been provided.

Figure 10:
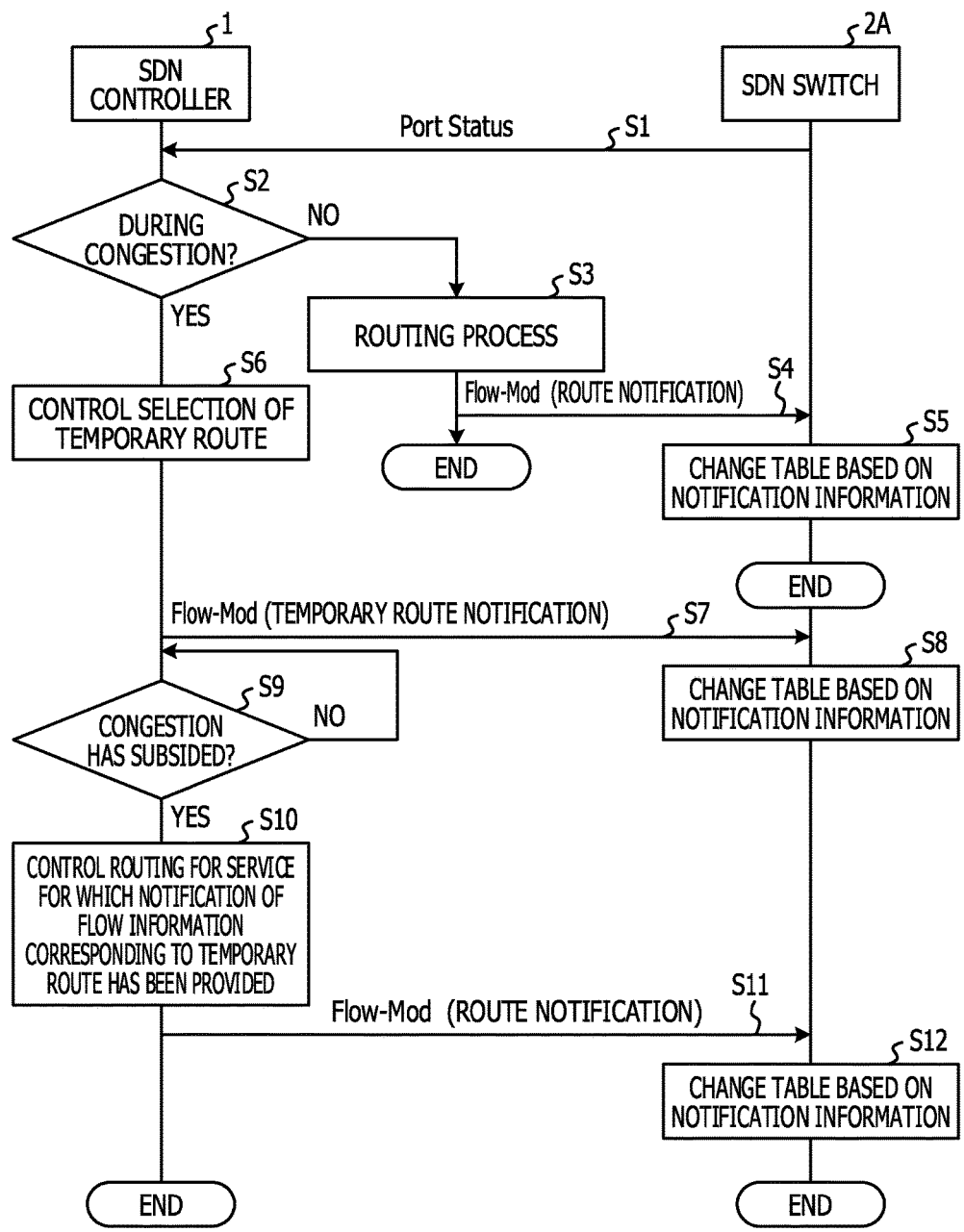
FIG. 10 is a diagram illustrating an example of an operation sequence of the SDN controller and SDN switches when a failure has occurred in the SDN network.

FIG. 10 is a diagram illustrating an example of a sequence of operations of the SDN controller 1 and the SDN switches 2 performed when a failure has occurred in the SDN network 100. Illustrated in FIG. 10 are the SDN controller 1 and an SDN switch 2A having a port where a failure has occurred, which causes link disconnection. The SDN switch 2A is a representative of a plurality of SDN switches 2 within the SDN network 100. Hereinafter, the SDN switch 2A, when being not particularly distinguished from the SDN switch 2, will be denoted as the SDN switch 2.

In S1, the SDN switch 2A detects a port where link disconnection will occur. Next, the SDN switch 2A sends a Port Status message to the SDN controller 1.

In S2, the SDN controller 1 receives a Port Status message (start of the process of FIG. 8) and determines whether or not control congestion occurs (FIG. 8, OP 2). If it is determined that control congestion occurs in the SDN controller 1, the process proceeds to S6. If control congestion does not occur in the SDN controller 1, the process proceeds to S3.

S3 to S5 denote examples of operations performed when control congestion does not occur in the SDN controller 1. In S3, the SDN controller 1 performs a routing process for a service passing through a failed port notification of which has been provided by using a Port Status message (FIG. 8, OP 7).

In S4, the SDN controller 1 notifies each SDN switch 2 by way of a Flow Mod message of flow information corresponding to the path decided upon through the routing process (FIG. 8, OP 8). For the SDN switch 2A that has sent the Port Status message, there is a change in an entry in the flow table, which at least includes deletion of flow information corresponding to the current path in the flow table. The SDN controller 1 therefore sends a Flow Mod message to the SDN switch 2A.

In S5, the SDN switch 2 changes settings of the flow table and sets a path according to the Flow Mod message. The flow table is a table that defines behaviors exhibited when a packet corresponding to the service is received, the table being stored in each SDN switch 2.

S6 to S11 denote examples of operations performed when control congestion occurs in the SDN controller 1. In S6, the SDN controller 1 performs processing of selecting a temporary route for the service passing through the failed port notification of which has been provided by using a Port Status message (FIG. 8, OP 3 and OP 4).

In S7, the SDN controller 1 notifies each SDN switch 2 of flow information corresponding to the temporary route by way of a Flow Mod message. For the SDN switch 2A that has sent a Port Status message, there is a change in an entry in the flow table, which at least includes deletion of flow information corresponding to the current path in the flow table. The SDN controller 1 therefore also sends a Flow Mod Message to the SDN switch 2A.

In S8, the SDN switch 2 changes settings of the flow table and sets the temporary route, according to the Flow Mod message. However, the SDN switch 2 does not recognize that the path, notification of which has been provided by way of the Flow Mod message, is the temporary route.

In S9, the SDN controller 1 regularly performs processing for detecting whether control congestion has subsided. If it is detected that control congestion of the SDN controller 1 has subsided, the sequence proceeds to S10. In S10, the SDN controller 1 performs a routing process for a service for which notification of flow information corresponding to the temporary route has been provided (FIG. 9, OP 11 to OP 13).

In S11, the SDN controller 1 notifies each SDN switch 2 of flow information corresponding to the path decided upon through the routing process, by way of a Flow Mod message (FIG. 9, OP 14). For the SDN switch 2A that has transmitted the Port Status message, if a new path is added, a Flow Mod message is sent to the SDN switch 2A.

In S12, according to the Flow Mod message, the SDN switch 2 changes settings of the flow table and sets the path.

Figure 11:
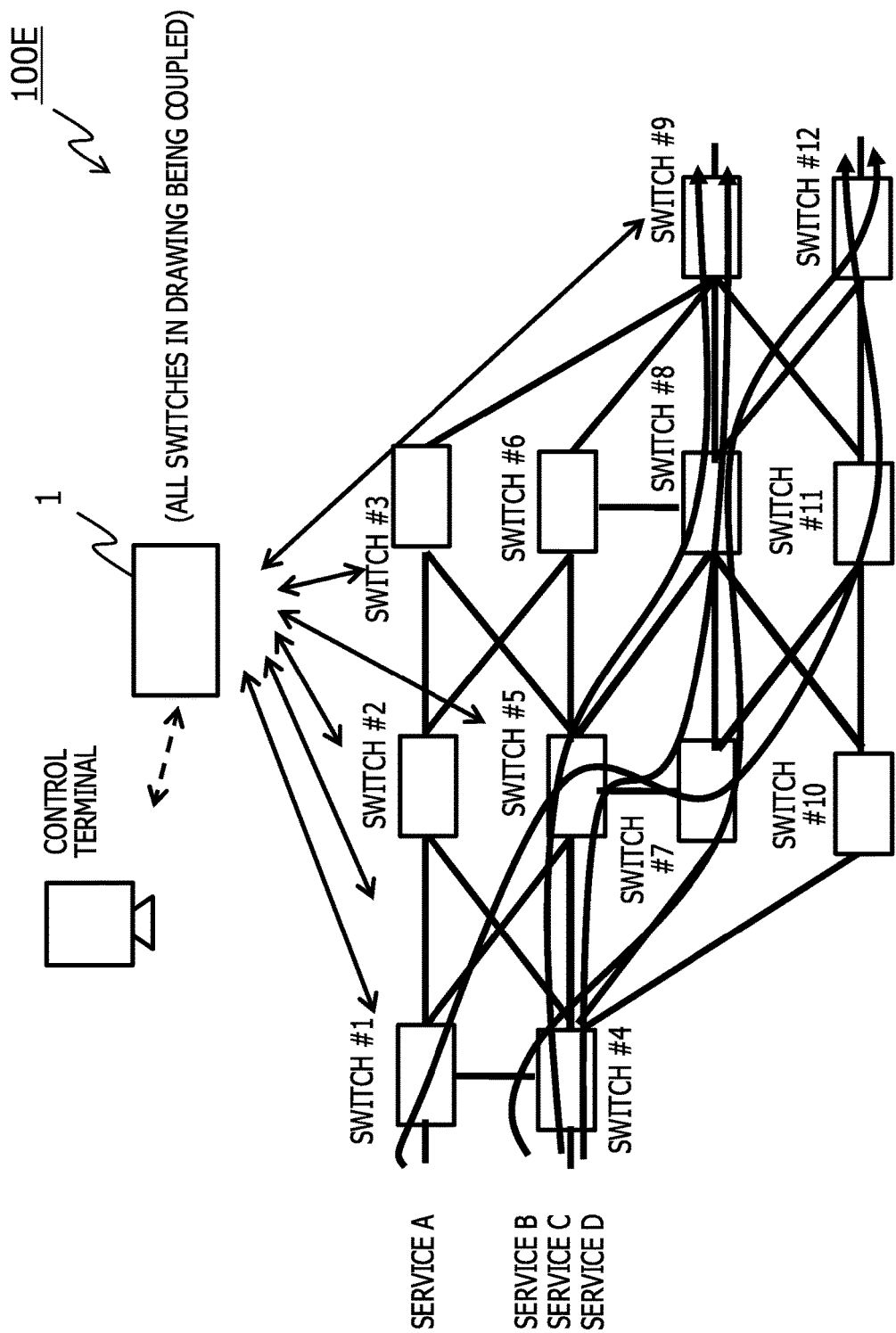
FIG. 11 is a diagram illustrating a system configuration of a specific example of the SDN network.

FIG. 11 is a diagram illustrating a system configuration of an SDN network 100 E in a specific example. In the specific example, the SDN network 100E includes the SDN controller 1 and SDN switches #1 to #12. In the SDN network 100E, packets of services A, B, C, and D flow. In the SDN network 100E illustrated in FIG. 11, it is assumed that the SDN controller 1 and the SDN switches #1 to #12 are coupled in such a manner as to be able to communicate with each other. Hereinafter, an SDN switch will be referred to simply as a switch.

FIG. 12 is a diagram depicting an example of the route table 17 of the SDN controller 1 in the SDN network 100E illustrated in FIG. 11. The path of service A passes through switches in the order of switch #1, switch #5, switch #7, switch #11, and switch #12. The path of service B passes through switches in the order of switch #4, switch #7, switch #8, and switch #12. The path of service C passes through switches in the order of switch #4, switch #5, switch #7, switch #8, and switch #9. The path of service D passes through switches in the order of switch #4, switch #5, switch #8, and switch #9.

FIG. 13 is a diagram depicting an example of the temporary route table 16 of the SDN controller 1 in the SDN network 100E illustrated in FIG. 11. Three temporary routes are prepared for each of services A to D.

Figure 14:
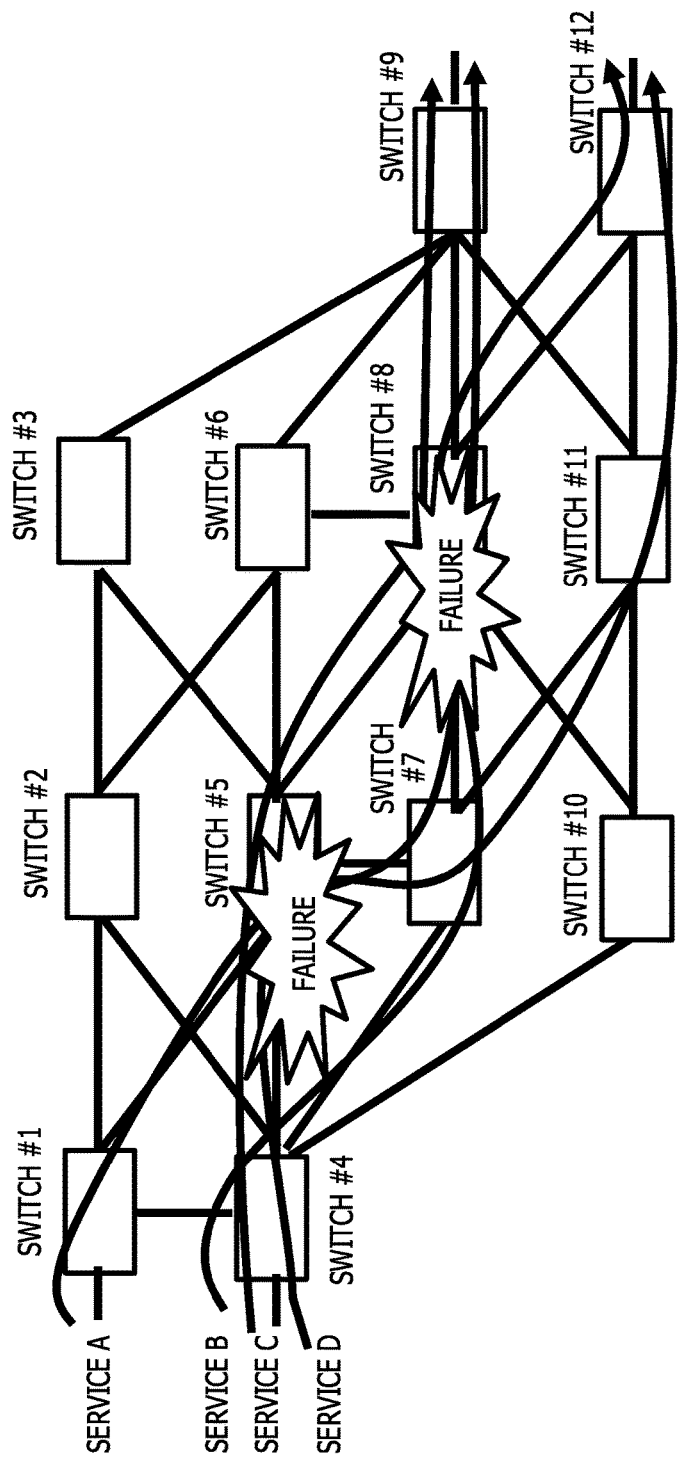
FIG. 14 illustrates an example of the case where failures have occurred in a first switch and a second switch in the SDN network illustrated in FIG. 11.

FIG. 14 illustrates an example in the case where failures have occurred in switch #5 and switch #8 in the SDN network 100E illustrated in FIG. 11. In FIG. 14, the SDN controller 1 is omitted. It is assumed that each of switch #5 and switch #8, in which a failure has occurred in the device itself, has entered a state where the switch is unable to communicate.

In the case of the example illustrated in FIG. 14, switches #1, #3, #4, #6, #7, #9, #10, and #12, which have established links with the failed switches #5 and #8, each detect link disconnection and send a Port Status message to the SDN controller 1. By way of example, switch #1 detects a link disconnection between port #11 of switch #1 and port #1 of switch #5 and provides notification. By way of example, switch #7 detects a link disconnection between port 12 of switch #7 and port #1 of switch #8 and provides notification.

The SDN controller 1 receives the Port Status messages. Then, referring to the route table 17, the SDN controller 1 checks whether or not there is a service passing through a link with the failed switch #5 or #8 (start of the process of FIG. 8, OP 1). With reference to the route table 17 of FIG. 12, services passing through links with the failed switch #5 or #8 are services A to D.

In the case of the example of failure illustrated in FIG. 14, it is assumed that, in the SDN controller 1, no control congestion has occurred at the time the Port Status messages are received. However, when many services are present in the network and the SDN controller 1 continuously receives many Port Status messages, control congestion due to routing processes occurs in the SDN controller 1.

If the SDN controller 1 detects occurrence of control congestion (FIG. 8, OP 2: YES), the SDN controller 1 starts search and notification of a temporary route (FIG. 8, OP 3 and OP 4). For example, when the temporary route table 16 depicted in FIG. 13 is used, temporary route #1 that does not include a port of switch #5 or #8 is employed for service A. Then, switches are notified of flow information corresponding to temporary route #1 (FIG. 8, OP 5). Temporary route #3 is employed for service B, temporary route #2 for service C, and temporary route #1 for service D. Then, switches are notified of flow information corresponding to each temporary route.

Figure 15:
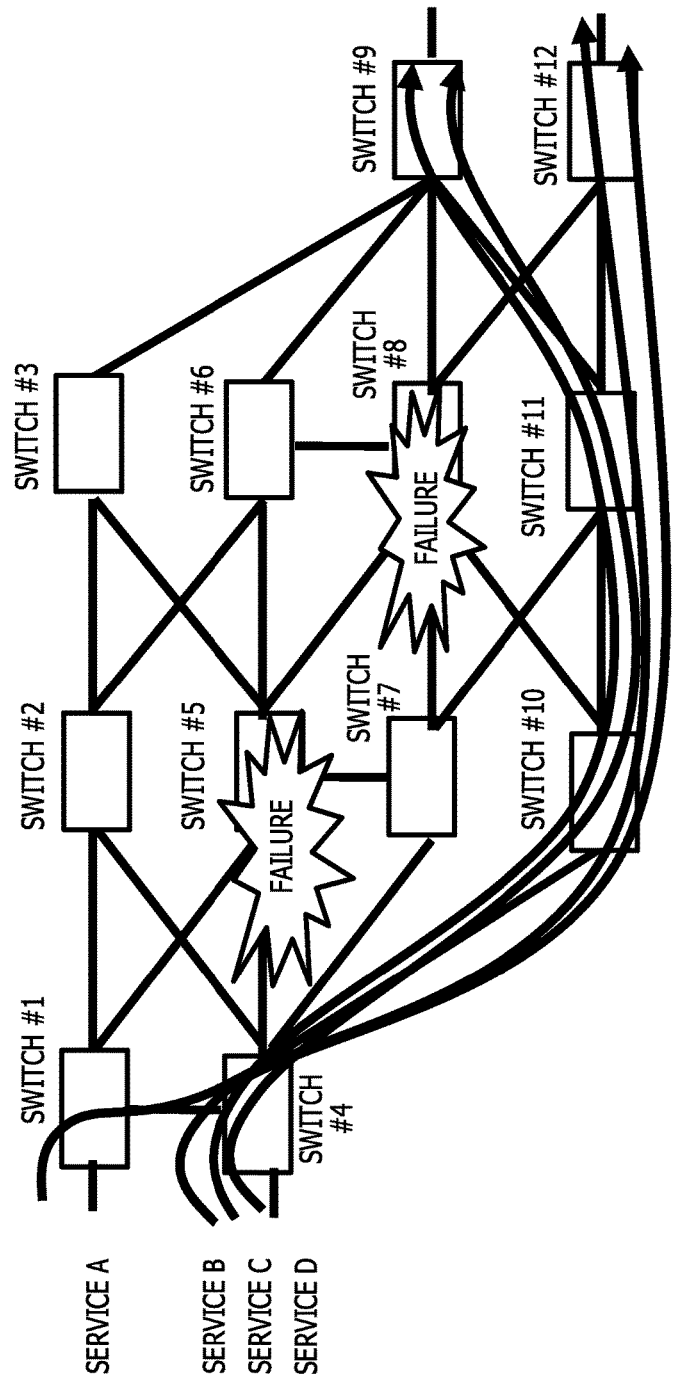
FIG. 15 is a diagram illustrating an SDN network in which path setting according to temporary routes is performed.

FIG. 15 is a diagram illustrating the SDN network 100E in which path setting is performed according to temporary routes. In a change from the path setting illustrated in FIG. 14 to the temporary route setting illustrated in FIG. 15, Flow Mod messages are provided from the SDN controller 1 to switches #1, #4, #7, #9, #10, #11, and #12. However, it is assumed that, in the failed switches #5 and #8, communication with the SDN controller 1 is also cut off.

FIG. 16 is an example of the route table 17 of the SDN controller 1 in the SDN network 100E illustrated in FIG. 15. In the route table 17 illustrated in FIG. 16, a temporary route is recorded for each of services A to D.

Once control congestion in the SDN controller 1 has subsided, the SDN controller 1 starts a routing process (stating the process of FIG. 9). The SDN controller 1 performs routing processes for services A to D. Then, the SDN controller 1 notifies each switch of flow information corresponding to the selected path (FIG. 9, OP 12 to OP 14).

Figure 17:
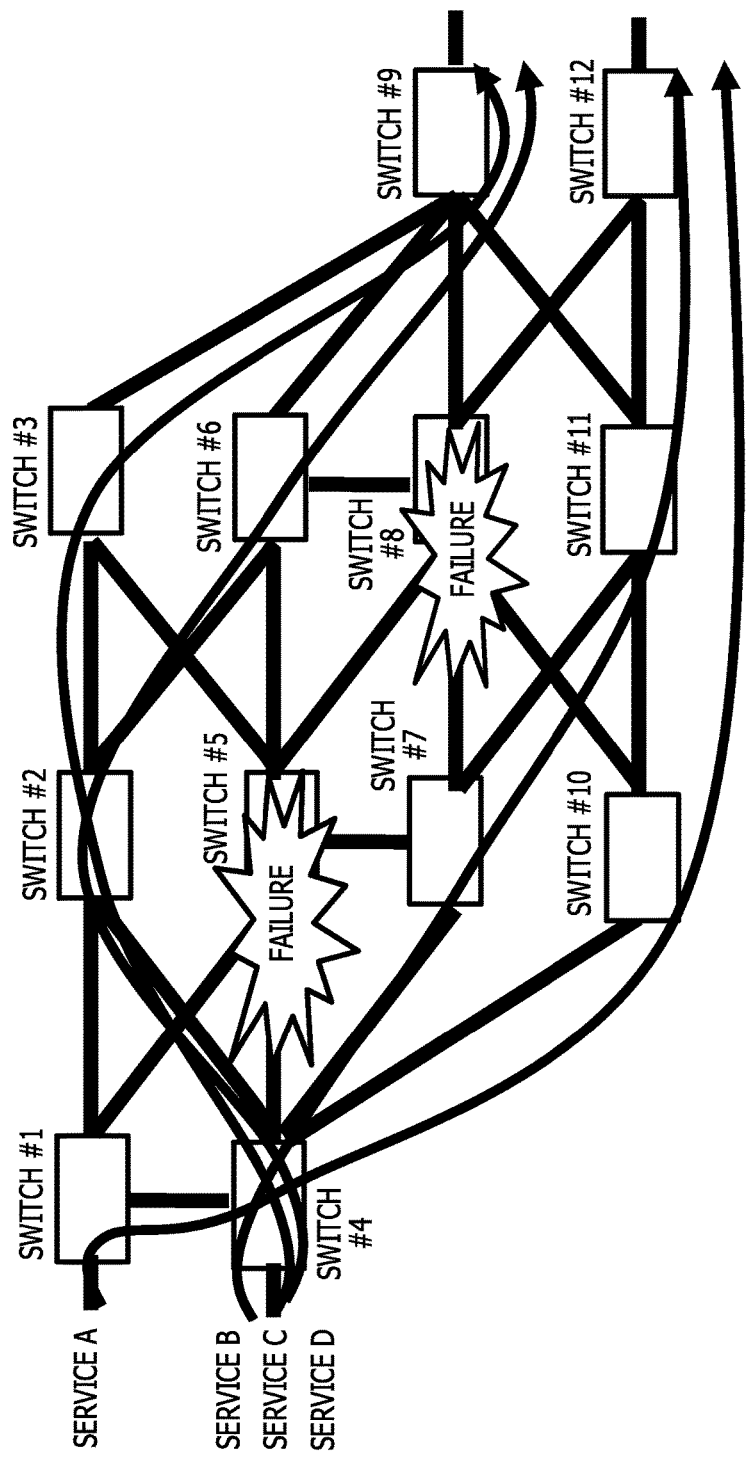
FIG. 17 is a diagram illustrating the SDN network in which paths are set through a path routing process.

FIG. 17 is a diagram illustrating the SDN network 100E in which paths selected through the routing process are set. FIG. 18 is an example of the route table 17 of the SDN controller 1 in the SDN network 100E illustrated in FIG. 17. The path of any of services A to D does not pass through failed switches #5 and #8 and is available for communication.

Figure 19:
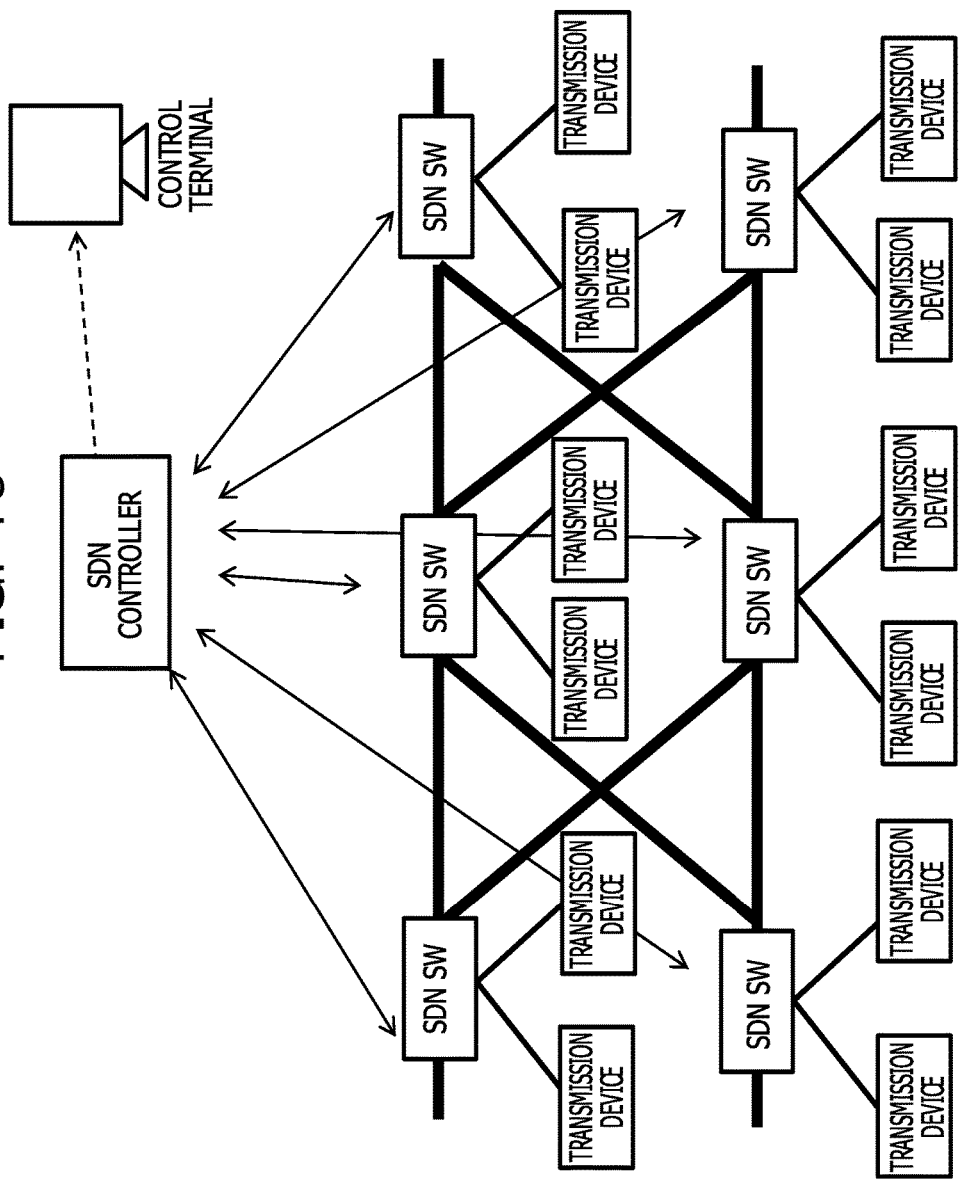
FIG. 19 is a diagram illustrating one of application examples of the SDN controller in the first embodiment.

FIG. 19 is a diagram illustrating one of application examples of the SDN controller 1 in the first embodiment. The SDN controller 1 described in the first embodiment is, as illustrated in FIG. 19, applicable to a network in the case where transmission devices are coupled below the SDN switches 2 and control in the lower layer is able to be performed by the SDN controller 1.

Figure 20:
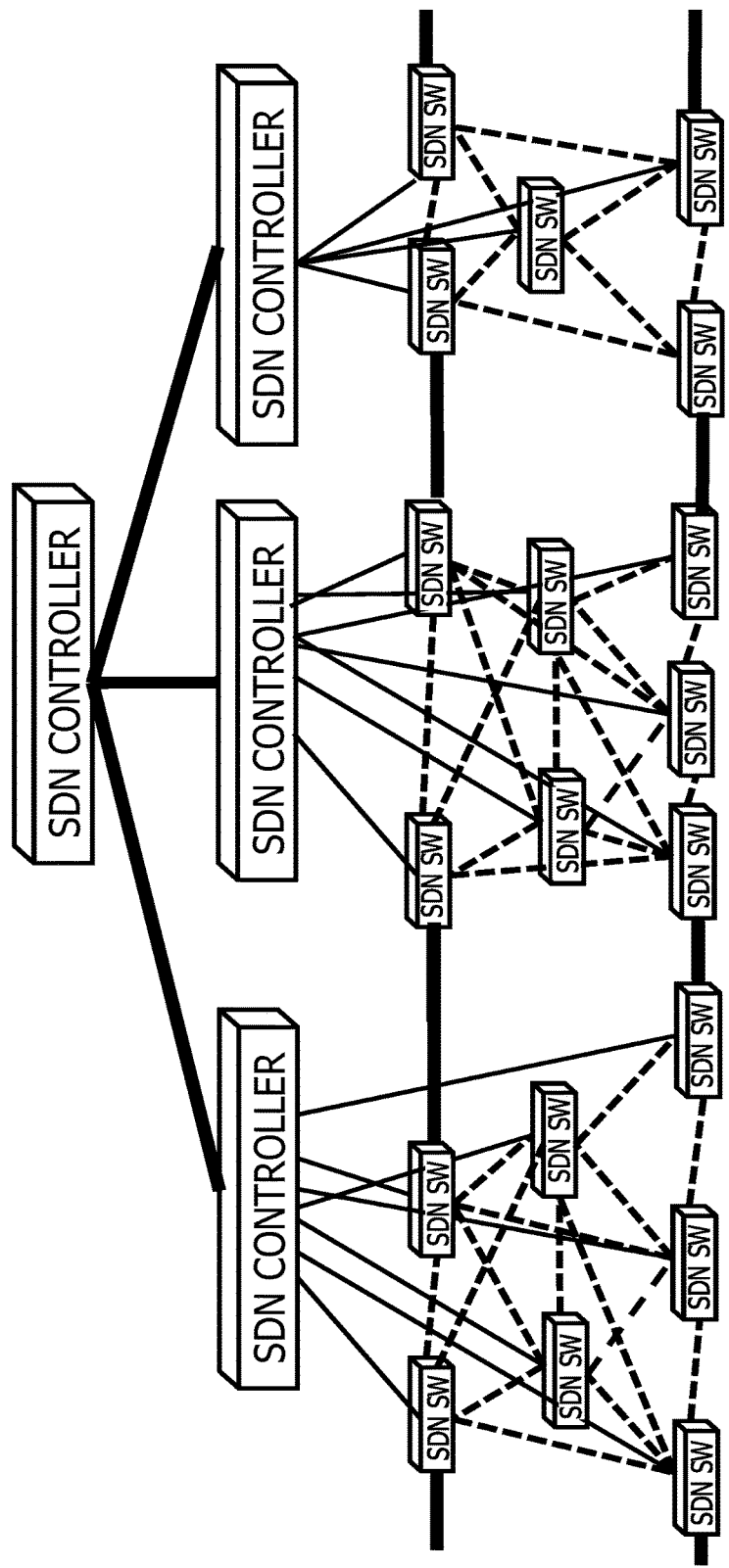
FIG. 20 is a diagram illustrating one of application examples of the SDN controller in the first embodiment.

FIG. 20 is a diagram illustrating one of application examples of the SDN controller 1 in the first embodiment. The SDN controller 1 described in the first embodiment is, as illustrated in FIG. 20, applicable to a network in a configuration in which SDN controllers are coupled at multiple stages.

In the example illustrated in FIG. 20, lower SDN controllers store in advance temporary routes for SDN switches respectively subordinate to the lower SDN controllers. Then, one of the lower SDN controllers, when receiving a Port Status message, provides notification of a temporary route in accordance with control congestion. Furthermore, one of the lower SDN controllers, when receiving notification of occurrence of a failure in a link coupling their respective management ranges, transmits a routing request to an upper SDN controller. The management range over SDN switches of an SDN controller is a group of SDN switches coupled to one SDN controller in such a manner that the group of SDN switches are subordinate to the SDN controller.

An upper SDN controller stores temporary routes among the management ranges of lower SDN controllers. The upper SDN controller, when receiving a routing request from a lower controller, searches for a temporary route in accordance with control congestion, like the SDN controller 1 in the first embodiment. Then, the upper SDN controller notifies lower SDN switches of flow information corresponding to the temporary route.

In the first embodiment, the SDN controller 1 stores in advance temporary routes for each service. The SDN controller 1, when receiving a routing request such as a Port Status message from the SDN switch 2, notifies the SDN switch 2 of flow information corresponding to a temporary route in accordance with control congestion. Thus, communication for each service may be made by using the temporary route, regardless of a delay in the routing process due to control congestion of the SDN controller 1. Additionally, the time over which communication is cut off as a result of control congestion of the SDN controller 1 may be reduced.

In the first embodiment, the SDN controller 1 records a service for which notification of flow information corresponding to a temporary route has been provided. Then, the SDN controller 1, once control congestion has subsided, performs a routing process for the service for which notification of flow information corresponding to the temporary route has been provided and notifies each SDN switch 2 of flow information corresponding to the path. Every temporary route does not correspond to a network status or does not fully satisfy service conditions. For this reason, a routing process is performed when control congestion has subsided, and thus it is possible to set a path that is in accordance with a network situation at that time and fully satisfies service conditions.

In the first embodiment, the SDN network has been described by way of example, objects to which the techniques of the SDN controller 1 of the first embodiment are applied are not limited to the SDN network. Techniques similar to those of the SDN controller 1 of the first embodiment may be applied to any route control device that centrally controls routes of a plurality of relay devices.

A program that causes a computer or another machine or device (hereinafter referred to as a computer or the like) to implement any of the above functions may be recorded on a recording medium readable by a computer or the like. By causing the computer or the like to read and execute the program on the recording medium, the above functions may be provided.

Here, the recording medium readable by a computer or the like refers to a non-transitory recording medium capable of accumulating information such as data and programs by using electrical, magnetic, optical, mechanical, or chemical actions and being read by a computer or the like. A recording medium removable from the computer or the like may be, for example, a flexible disc, a magneto-optical disc, a compact disc ROM (CD-ROM), a CD-rewritable (R/W), a digital versatile disc (DVD), a Blu-ray disc, a DAT, an 8 mm tape, or a memory card such as a flash memory. A recording medium fixed to a computer or the like may be a hard disk, a ROM, or the like. Furthermore, a solid state drive (SSD) is usable as a recording medium removable from a computer or the like or as a recording medium fixed to a computer or the like.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A control method executed by an information processing device including a memory configured to store information on a plurality of temporary routes set for each kind of service, the control method comprising:
   receiving a routing request from a switch among a plurality of switches;
   extracting, from the memory, a temporary route corresponding to a service related to the routing request when it is determined that processing congestion of the information processing device occurs;
   setting the extracted temporary route for one or more related switches among the plurality of switches;
   determining a route corresponding to the service, based on a predetermined condition of the service, when it is determined that the processing congestion of the information processing device has subsided; and
   setting the determined route for the one or more related switches among the plurality of switches.

2. The control method according to claim 1, further comprising:

determining a route corresponding to the service, based on the predetermined condition when it is not determined that the processing congestion occurs.

3. The control method according to claim 1, wherein the receiving includes receiving the routing request transmitted from the switch among the plurality of switches upon occurrence of a failure of a link between the switch and another switch among the plurality of switches.

4. The control method according to claim 1, wherein the receiving includes receiving, upon reception of an unknown packet performed by the switch among the plurality of switches, the routing request transmitted from the switch.

5. The control method according to claim 1, wherein the extracting includes extracting a temporary route among a plurality of temporary routes set for the service, based on at least either a communication contract condition or respective statuses of the plurality of switches.

6. The control method according to claim 1, further comprising
storing a route different from the determined route, as a temporary route corresponding to the service, in the memory.

7. The control method according to claim 1, further comprising
determining whether processing congestion of the information processing device occurs, based on a number of the routing requests accepted in a given period.

8. The control method according to claim 1, further comprising
determining whether processing congestion of the information processing device occurs, based on a usage rate of a processor.

9. The control method according to claim 1, further comprising
determining whether processing congestion of the information processing device occurs, based on any of a period of time used from reception to response of the routing request.

10. The control method according to claim 1, wherein the predetermined condition of the service includes at least any condition among a communication speed, a delayed time, and a used bandwidth.

11. An information processing device that performs routing of a network including a plurality of switches, comprising:
a memory configured to store information on a plurality of temporary routes set for each kind of service;
a processor coupled to the memory and configured to:
receive a routing request from a switch among the plurality of switches;
extract, from the memory, a temporary route corresponding to a service related to the routing request when it is determined that processing congestion of the information processing device occurs;
set the extracted temporary route for one or more related switches among the plurality of switches;
determine a route corresponding to the service, based on a predetermined condition, when it is determined that the processing congestion of the information processing device has subsided; and
set the determined route for the one or more related switches among the plurality of switches.

12. A communication system, comprising:
a plurality of switches; and
an information processing device that executes routing of a network including the plurality of switches,
wherein the information processing device includes
a memory configured to store information on a plurality of temporary routes set for each kind of service, and
a processor coupled to the memory and configured to:
receive a routing request from a switch among the plurality of switches,
extract, from the memory, a temporary route corresponding to a service related to the routing request when it is determined that processing congestion of the information processing device occurs,
set the extracted temporary route for one or more related switches among the plurality of switches,
determine a route corresponding to the service, based on a predetermined condition, when it is determined that processing congestion of the information processing device has subsided, and
set the determined route for the one or more related switches among the plurality of switches.

* * * * *